United States Patent
Laverick et al.

(10) Patent No.: US 7,142,980 B1
(45) Date of Patent: Nov. 28, 2006

(54) VEHICLE DASH-MOUNTED NAVIGATION DEVICE

(75) Inventors: David J. Laverick, Overland Park, KS (US); Jeffrey D. Minelli, Olathe, KS (US)

(73) Assignee: Garmin Ltd. (KY)

( * ) Notice: Subject to any disclaimer, the term of this patent is extended or adjusted under 35 U.S.C. 154(b) by 229 days.

(21) Appl. No.: 10/834,453

(22) Filed: Apr. 29, 2004

(51) Int. Cl.
*C01C 21/00* (2006.01)

(52) U.S. Cl. .................................................. 701/213
(58) Field of Classification Search ............... None
See application file for complete search history.

(56) References Cited

U.S. PATENT DOCUMENTS

| | | | |
|---|---|---|---|
| 5,014,346 A | 5/1991 | Phillips | 455/575.7 |
| 5,020,845 A | 6/1991 | Falcoff et al. | 296/37.7 |
| D355,412 S | 2/1995 | Rak et al. | D14/242 |
| 5,415,554 A | 5/1995 | Kempers et al. | 439/34 |
| D365,032 S | 12/1995 | Laverick et al. | D10/78 |
| D365,550 S | 12/1995 | Houlihan | D14/114 |
| D366,036 S | 1/1996 | Houlihan | D14/114 |
| D374,227 S | 10/1996 | Williams | D14/137 |
| D389,173 S | 1/1998 | Komuta et al. | D18/7 |
| D397,679 S | 9/1998 | Hawkins et al. | D14/100 |
| 5,865,403 A * | 2/1999 | Covell | 248/27.1 |
| D409,927 S | 5/1999 | Wiegers et al. | D10/65 |
| 5,910,882 A * | 6/1999 | Burrell | 361/681 |
| 5,999,126 A * | 12/1999 | Ito | 342/357.1 |
| D423,468 S | 4/2000 | Jenkins | D14/100 |
| 6,125,030 A | 9/2000 | Mola | 361/681 |
| D431,558 S | 10/2000 | Winstead | D14/248 |
| D432,535 S | 10/2000 | Loh et al. | D14/345 |
| 6,129,321 A * | 10/2000 | Minelli et al. | 248/183.1 |
| D440,542 S | 4/2001 | Hawkins et al. | D14/100 |
| D442,173 S | 5/2001 | Wang et al. | D14/342 |
| D442,583 S | 5/2001 | Ohta et al. | D14/346 |
| D443,612 S | 6/2001 | Evers et al. | D14/341 |
| D443,613 S | 6/2001 | Do et al. | D14/345 |
| D443,614 S | 6/2001 | Do et al. | D14/345 |
| D445,418 S | 7/2001 | Chen | D14/341 |
| D446,526 S | 8/2001 | Evers et al. | D14/441 |
| D451,833 S | 12/2001 | Schoenfish | D10/74 |
| D452,687 S | 1/2002 | Yeh | D14/342 |
| D452,968 S | 1/2002 | Evers et al. | D14/345 |
| D453,300 S | 2/2002 | Schoenfish et al. | D10/65 |
| D453,477 S | 2/2002 | Schoenfish et al. | D10/65 |
| D454,348 S | 3/2002 | Yeh | D14/342 |
| D454,349 S | 3/2002 | Makidera et al. | D14/343 |
| D456,289 S | 4/2002 | Laverick | D10/65 |
| 6,370,037 B1 | 4/2002 | Schoenfish | 361/807 |
| D456,804 S | 5/2002 | Fisher et al. | D14/341 |
| D456,805 S | 5/2002 | Ono | D14/342 |

(Continued)

OTHER PUBLICATIONS www.garmin.com; Owner's manual for GPS V personal navigator (copyright 2001-2003).*

(Continued)

*Primary Examiner*—Michael J. Zanelli
(74) *Attorney, Agent, or Firm*—David L. Terrell

(57) ABSTRACT

A GPS system (10) which may be mounted on a dashboard (12) of any vehicle (14) after the vehicle has been manufactured yet appears to be integral with the dashboard. The GPS system (10) includes a GPS device (16), a hood (18) for covering the GPS device, a base (20) for supporting the GPS device and the hood on the vehicle dashboard, and a faceplate (22) for placement over the front face of the GPS device for framing the GPS display.

26 Claims, 4 Drawing Sheets

U.S. PATENT DOCUMENTS

| | | | |
|---|---|---|---|
| D457,445 S | 5/2002 | Schoenfish | D10/65 |
| D459,249 S | 6/2002 | Schoenfish et al. | D10/65 |
| D460,756 S | 7/2002 | Allen, Jr. et al. | D14/341 |
| 6,434,403 B1 | 8/2002 | Ausems et al. | 455/556 |
| 6,439,530 B1 | 8/2002 | Schoenfish | 248/346.06 |
| D463,423 S | 9/2002 | Webb | D14/343 |
| D463,424 S | 9/2002 | Ausems | D14/343 |
| 6,482,082 B1 | 11/2002 | Derleth et al. | 454/156 |
| 6,522,298 B1 * | 2/2003 | Burgett et al. | 342/462 |
| 6,529,381 B1 | 3/2003 | Schoenfish | 361/725 |
| D477,597 S | 7/2003 | Laverick et al. | D14/346 |
| 6,600,450 B1 | 7/2003 | Efanov | 343/726 |
| 6,633,347 B1 | 10/2003 | Kitazawa | 348/837 |
| D484,127 S | 12/2003 | Laverick et al. | D14/345 |
| 6,673,409 B1 * | 1/2004 | Wheatley | 428/40.1 |
| 6,686,887 B1 | 2/2004 | Kasuya | 343/702 |
| 6,762,725 B1 | 7/2004 | Beard | 343/702 |
| 6,840,487 B1 | 1/2005 | Carnevali | 248/346.06 |
| 2002/0113451 A1 | 8/2002 | Chang | 296/37.7 |
| 2002/0138160 A1 | 9/2002 | Hessing et al. | 701/1 |
| 2003/0102419 A1 | 6/2003 | Carnevalli | |
| 2003/0184111 A1 | 10/2003 | Sturt | 296/37.8 |
| 2003/0188103 A1 | 10/2003 | Edwards et al. | 711/115 |
| 2003/0208314 A1 | 11/2003 | Funk et al. | 701/207 |
| 2004/0026947 A1 | 2/2004 | Kitano et al. | 296/24.34 |
| 2004/0264115 A1 * | 12/2004 | Greenidge et al. | 361/679 |

OTHER PUBLICATIONS www.garmin.com; Owner's manual for StreetPilot 2610/2650 (copyright 2004).*

* cited by examiner

VEHICLE DASH-MOUNTED NAVIGATION DEVICE

BACKGROUND OF THE INVENTION

1. Field of the Invention

The present invention relates to GPS and other navigational devices. More particularly, the invention relates to a GPS device which may be mounted on a dashboard of any vehicle after the vehicle has been manufactured yet appears to be integral with the dashboard.

2. Description of the Prior Art

GPS and other navigational devices continue to increase in popularity as more users desire to know their exact location, track their movements, and receive directions while driving, hiking, and performing other activities. Such navigational devices are particularly useful and popular in vehicles because drivers and passengers often desire to have such navigational capabilities while traveling.

GPS devices designed for use in vehicles are typically either fixed, factory-installed devices mounted within a vehicle's dash or portable devices which can be carried into a vehicle for use therein. Both of these types of navigational devices offer advantages, but also suffer from several disadvantages.

Factory-installed GPS devices have the advantage of being integrally mounted within a factory-provided opening in a vehicle while the vehicle is being manufactured and thus present a professional, "finished" appearance. However, these devices are very expensive and typically must be mounted within a vehicle's center stack (the area on the dash between the driver and front passenger where car stereos and other equipment is typically located). Mounting a navigational device in a vehicle's center stack takes up valuable space which is needed for other components such as stereo receivers, climate controls, etc. Moreover, mounting a navigational device in a vehicle's center stack requires a driver to look down and away from the road to read navigational information, thus increasing the chance of accidents. Another limitation is that such devices cannot be easily added to a vehicle after the vehicle has been manufactured. For example, although a car dealer may have hundreds of vehicles available for sale, only a few of the vehicles may be equipped with factory-installed navigational devices. If a customer wishes to have a GPS device installed in a vehicle not originally equipped with such a device, it is impractical and too costly to ship the vehicle back to the factory for installing a factory-installed GPS device.

Portable GPS devices solve many of these limitations because they can be carried into any vehicle and used without taking up valuable space in the vehicle's center stack. Portable GPS devices are also typically much less expensive than factory-installed GPS devices. However, portable GPS devices can be difficult to use while driving because they are not mounted in a fixed location and therefore can be easily dropped and/or misplaced. Similarly, because they are not mounted to a fixed location, portable GPS devices must be held while in use, thus diverting a driver's attention from the road.

Mounting devices for removably mounting a portable GPS device on a vehicle's dash or elsewhere have been designed to alleviate some of these problems. However, such mounting devices can be unsightly because they often to do not match or complement factory-installed components of the vehicle such as the dashboard. Moreover, because these mounting devices are designed to be easily removable, they often become loose or unintentionally detached due to vehicle vibrations and other movements.

SUMMARY OF THE INVENTION

The present invention solves the above described limitations and provides a distinct advance in the art of GPS and other navigational devices. More particularly, the invention provides a GPS system which may be mounted on a dashboard of any vehicle after the vehicle has been manufactured yet appears to be integral with the dashboard.

In one embodiment of the invention, the navigation system includes a portable GPS device for mounting on a vehicle dashboard and a hood for substantially covering the GPS device while permitting viewing of the GPS display. The GPS device includes a GPS receiver, a processor, a display and possibly other conventional components. The GPS device may be any conventional portable GPS device such as the StreetPilot® Model 2610/2650 GPS device manufactured by Garmin International, Inc. The GPS device may be coupled with the vehicle's power bus for receiving power therefrom and may even be coupled with the vehicle's data bus for receiving data representative of the vehicle's speed and any turns for use in dead reckoning when the GPS device cannot receive GPS satellite signals.

The GPS device also preferably includes a housing on which its display is mounted and in which its GPS receiver and processor are enclosed. The housing is preferably wedge-shaped and tapered from front to back so that the GPS system more easily fits under the vehicle's windshield. A GPS antenna may be coupled with the GPS receiver and placed on the housing for facilitating receipt of GPS satellite signals. The housing is preferably metallic and is electrically coupled with the GPS antenna so as to serve as a ground plane for the antenna. The wedge-shaped housing includes a planer top wall which is angled relative to horizontal for tilting the GPS antenna for providing the optimal viewing angle for GPS satellite signals. The GPS device may also include a speaker mounted on the housing and coupled with the processor and an expansion slot for removably receiving memory cartridges that have navigation data stored thereon.

The hood covers the housing of the GPS device and is configured to appear integral with the dashboard so as to provide a more professional, "finished" appearance similar to factory-installed GPS devices. The hood is preferably formed of a material similar to the dashboard and colored similar to the dashboard so that it appears to be integrally formed with the dashboard.

The GPS system may also include a faceplate circumferentially mounted over the display for framing the display. A number of large control buttons are positioned on the front of the faceplate and are electrically coupled to the GPS processor for allowing a user to provide user input thereto. An infrared receiver may also be provided on the faceplate for receiving data and instructions from an infrared transmitter such as those found on remote control devices.

The GPS system may also include a base for supporting the GPS device and the hood on the vehicle's dashboard. The base presents a top face and a bottom face, and the bottom face is preferably contoured to align with any similar contours on the vehicle's dashboard. This levels the top face so that the GPS device resting thereon is substantially level relative to horizontal. As with the hood, the base is preferably formed of a material similar to the dashboard and is colored similar to the dashboard so as to appear integral therewith.

By constructing a GPS system as described herein, numerous advantages are realized. Specifically, the present invention achieves all of the advantages of factory-installed GPS devices and portable GPS devices but suffers from none of their disadvantages. For example, the GPS system of the present invention may be mounted on a dashboard of any vehicle even after the vehicle has been manufactured yet appears to be integrally formed with the dashboard. Thus, the GPS system provides the professional, "finished" appearance of factory-installed GPS devices while being relatively inexpensive and easy to install in any vehicle. The GPS system of the present invention may also be mounted on top of a vehicle's dashboard, rather than in the vehicle's center stack, where it can be more easily viewed without drawing a driver's attention from the road for a prolonged period of time.

Other aspects of the invention are described more fully in the detailed description of the PREFERRED EMBODIMENTS.

BRIEF DESCRIPTION OF THE DRAWING FIGURES

A preferred embodiment of the present invention is described in detail below with reference to the attached drawing figures, wherein.

Figure 1:
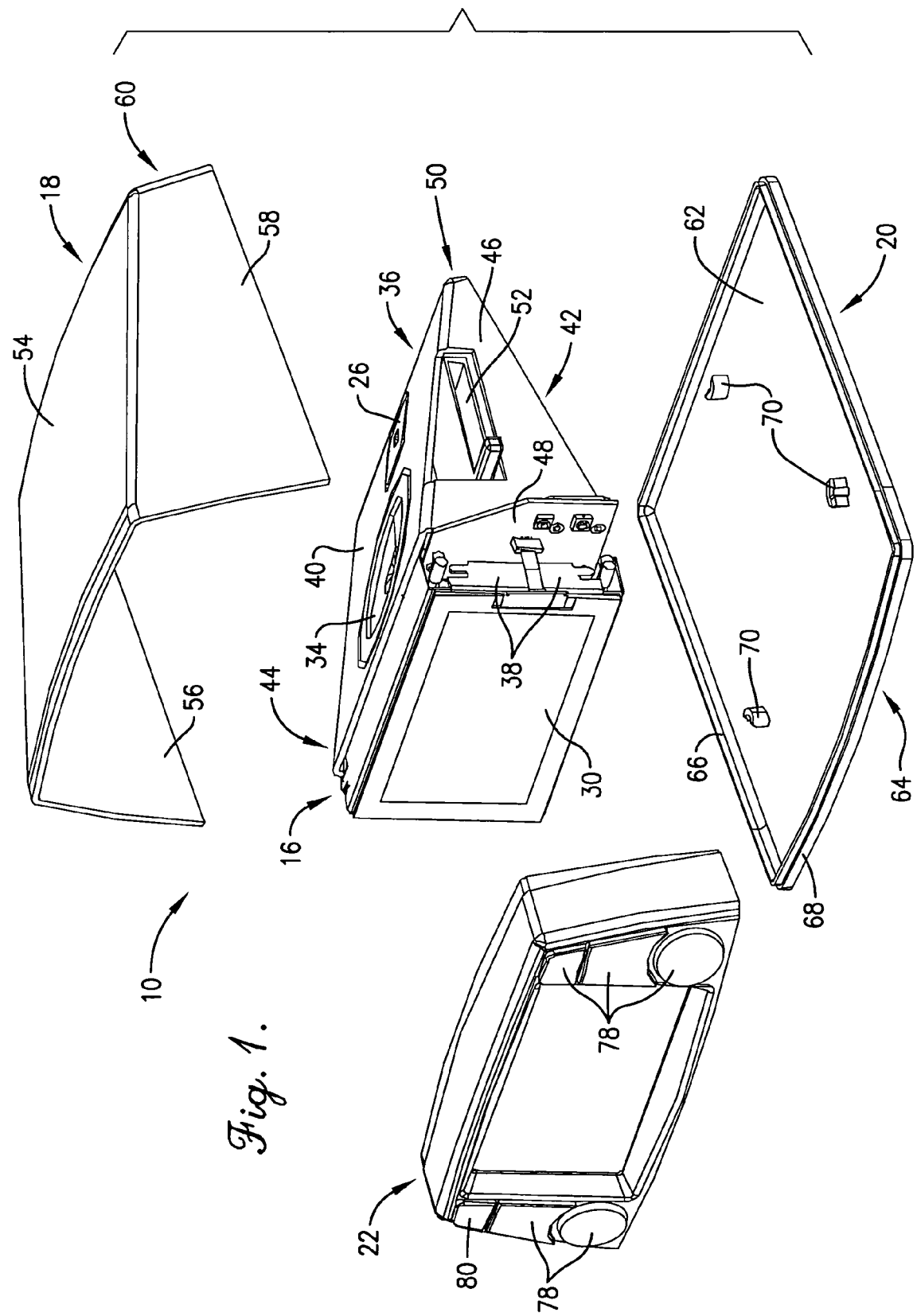
FIG. 1 is an exploded isometric view of a GPS system constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
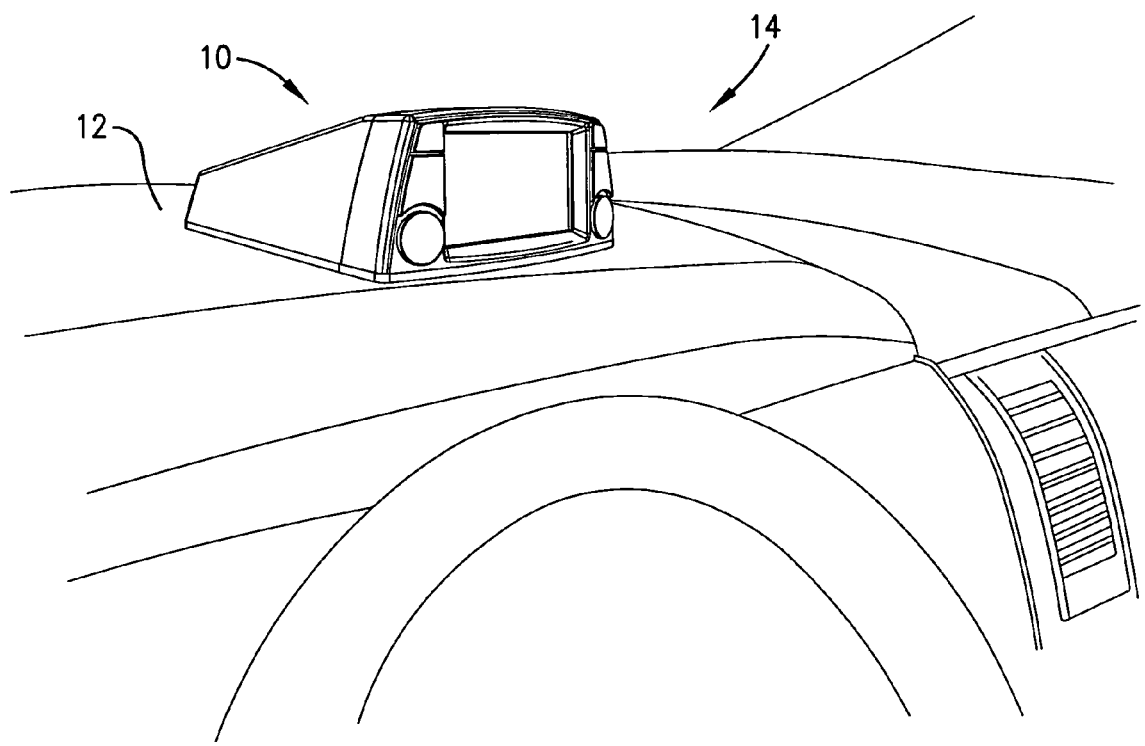
FIG. 2 is a front perspective view of the GPS system shown mounted on a vehicle dashboard.
Figure 3:
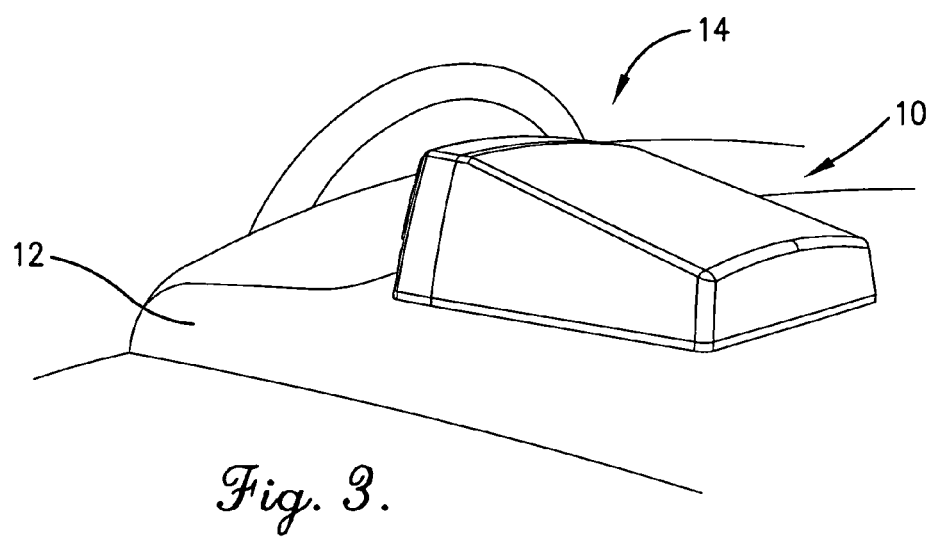
FIG. 3 is a rear perspective view of the GPS system shown mounted on the vehicle dashboard.

Turning now to the drawing figures, and initially FIG. 1, a navigation system 10 constructed in accordance with a preferred embodiment of the present invention is illustrated. As shown in FIGS. 2 and 3, the navigation system 10 is configured for mounting on a dashboard 12 of a vehicle 14 for providing navigational capabilities to the vehicle. The navigational system 10 is preferably installed in the vehicle by an authorized dealer or a certified after-market installer after the vehicle has been manufactured. The navigation system 10 is preferably fixedly mounted to the dashboard, but may also be removably mounted to the dashboard.

Returning to FIG. 1, the preferred navigation system 10 broadly includes a GPS device 16, a hood 18 for covering portions of the GPS device, a base 20 for supporting the GPS device and the hood on the vehicle dashboard 12, and a faceplate 22 for placement over the front face of the GPS device 16.

Figure 6:
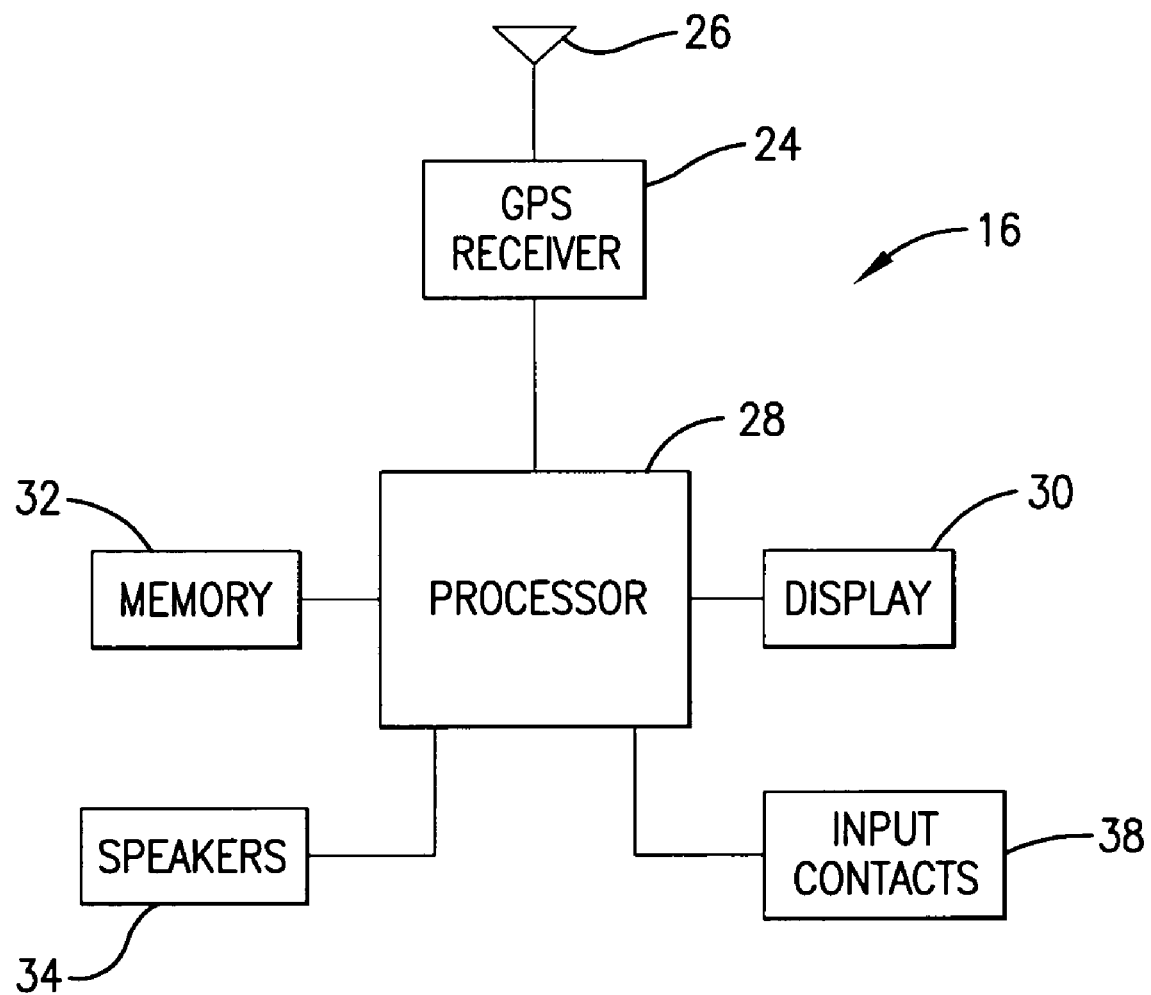
FIG. 6 is a block diagram depicting certain components of the GPS device of the GPS system.

The GPS device 16 is preferably a conventional portable GPS device such as the StreetPilot® Model 2610/2650 GPS device manufactured by Garmin International, Inc. modified as described herein. As illustrated in FIG. 6, the GPS device broadly includes a GPS receiver 24 for receiving GPS signals from a plurality of GPS satellites, a GPS antenna 26 coupled with the GPS receiver 24 for facilitating receipt of the GPS signals, a processor 28 coupled with the GPS receiver for determining a location of the device as a function of the GPS signals, a display 30 coupled with the processor for displaying information corresponding to the location of the GPS device, internal or removable memory 32 for storing navigation data thereon, a speaker 34 for providing audible instructions, and a housing 36 (see FIG. 1) on which the display is mounted and in which the GPS receiver and the processor are enclosed. The display 30 is preferably a touch screen display which permits a user to provide inputs to the GPS device by touching the display in a conventional manner. The GPS device 16 may also include a number of input contacts 38 coupled with the processor 26 and configured for coupling with inputs on the faceplate 22 as described in more detail below.

In accordance with one aspect of the present invention, the housing 36 is preferably wedge-shaped and tapers from front to back. The housing includes a planar top face 40, a planar bottom face 42, triangular-shaped left and right side walls 44, 46, a planar, vertically-extending front wall 48, and a short rear wall 50.

The GPS antenna 26 is preferably a patch antenna mounted on the top face 40 of the housing and coupled with the processor 28 for facilitating receipt of GPS satellite signals. In preferred forms, the housing 36 is formed of metal or other conductive materials and is electrically coupled with the antenna 26 so as to serve as a ground plane for the antenna. Because the housing is wedge-shaped, the top face 40 is angled downwardly from front to back to tilt the antenna 26 relative to horizontal. This provides an enhanced viewing angle for the antenna so that it can better detect GPS satellite signals. The top face 40 preferably tilts between 5 and 30 degrees from horizontal.

The bottom face 42 of the housing is angled slightly upwardly from front to back. This increases the angle at which the top face 40 and the antenna 26 mounted thereon are tilted relative to horizontal and also slightly tilts the top of the display 30 backward relative to the bottom of the display to improve the viewing angle of the display. The bottom face 42 is preferably angled between 5 and 10 degrees relative to horizontal.

The speaker 34 is also preferably mounted on the top face 40 of the housing, but may be mounted elsewhere as a matter of design choice. The memory 32 may be internal memory or may consist of a memory card slot 52 coupled with the processor 28 and configured for removably receiving memory cartridges on which navigation data is stored. The memory card slot and memory cartridges may use compact flash, secured digital, or any other conventional memory storage technology.

The hood 18 is provided for covering the housing 36 of the GPS device 16 while permitting viewing of the GPS display 30. The hood 18 includes a generally planar top wall 54 which is angled downwardly from front to back in a similar fashion as the top wall 40 of the GPS device housing 36, a pair of left and right side walls 56, 58, and a relatively planar rear wall 60. As best illustrated in FIGS. 1 through 3, the hood 18 generally mimics the wedge-shape of the GPS device housing 36 so that the assembled GPS system 10 tapers downwardly from front to back. The wedge-shaped housing 36 and hood 18 permit the GPS system to be placed on the dashboard under the vehicle's front windshield without contacting the windshield as illustrated in FIGS. 2 and 3. This permits the GPS system 10 to be mounted further back on the dashboard than GPS devices with conventional-shaped housings.

In accordance with one important aspect of the present invention, the hood 18 is preferably formed of a material which is the same as or similar to the material of the vehicle dashboard 12 so that the hood appears to be integrally formed with the dashboard. For example, if the dashboard is formed of a synthetic resin or fiberglass material, the hood is preferably formed of the same or similar material. The hood also preferably includes the same texture as the dashboard and is preferably colored the same as the dashboard.

The base 20 is preferably generally rectangular in shape and is provided for supporting the GPS device 16 and the hood 18 on the dashboard 12. The base may be secured to the top surface of the vehicle dashboard with any conventional fasteners such as adhesives or screws. The base 20 includes a top face 62, a bottom face 64, and a continuous, upstanding flange 66 spaced slightly inwardly from the outer edge of the top face 62 which defines a connection ridge 68 around the periphery of the top face 62. The lower edges of the hood 18 rests within this ledge 68 and may be bonded thereto with any conventional fasteners such as adhesive. The base 20 may also include a number of tabs 70 extending upwardly from its top face 62 for mating with corresponding structure on the bottom of the GPS housing for securely positioning the GPS device on the base.

Figure 5:
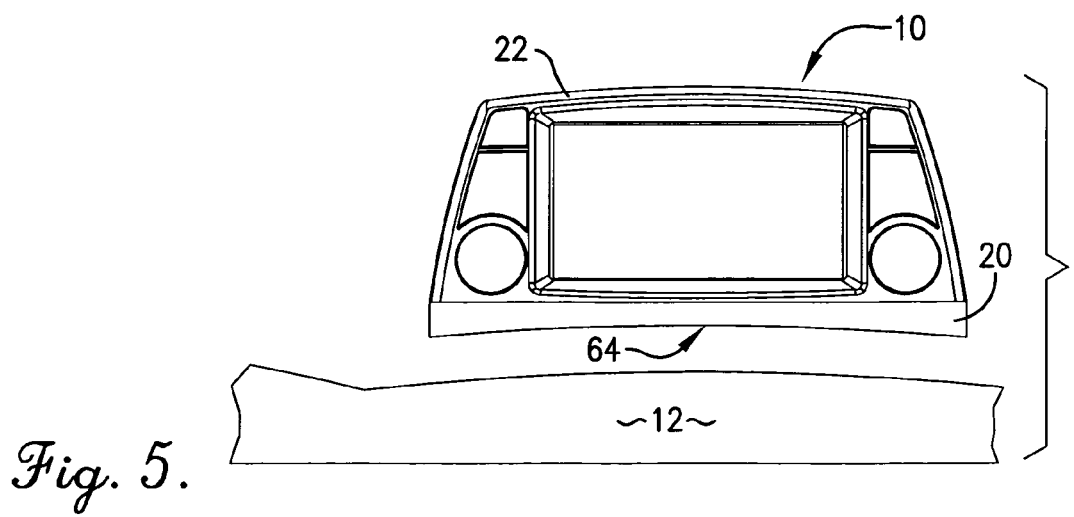
FIG. 5 is an exploded elevational view of the GPS system shown mounted on a curved dashboard and illustrating a corresponding curvature in the base of the GPS system.

In accordance with one important aspect of the present invention, the bottom face 64 of the base 20 may be curved or contoured to align with any similar curves or contours on the dashboard as illustrated in FIG. 5. This permits the base 20 to securely mate with the dashboard 12 and to level its top face 56 relative to horizontal so as to substantially laterally level the GPS device 16 resting thereon.

As with the hood 18, the base 20 is preferably formed of the same or similar material as the dashboard so as to appear integral with the dashboard. The base may also be textured and colored the same as the dashboard.

Because the GPS system 10 may be mounted in a variety of different vehicles, several differently shaped bases may be provided. For example, one base may be designed to align with the dashboard of a particular vehicle and a second base may be provided which more closely aligns with the dashboard of a different vehicle. Conventional gaskets and/or padding may also be placed between the bottom face 64 of the base 20 and the top surface of the dashboard 12 so as to fill any gaps therebetween to permit use of just a few different bases with a much larger number of vehicles.

Figure 4:
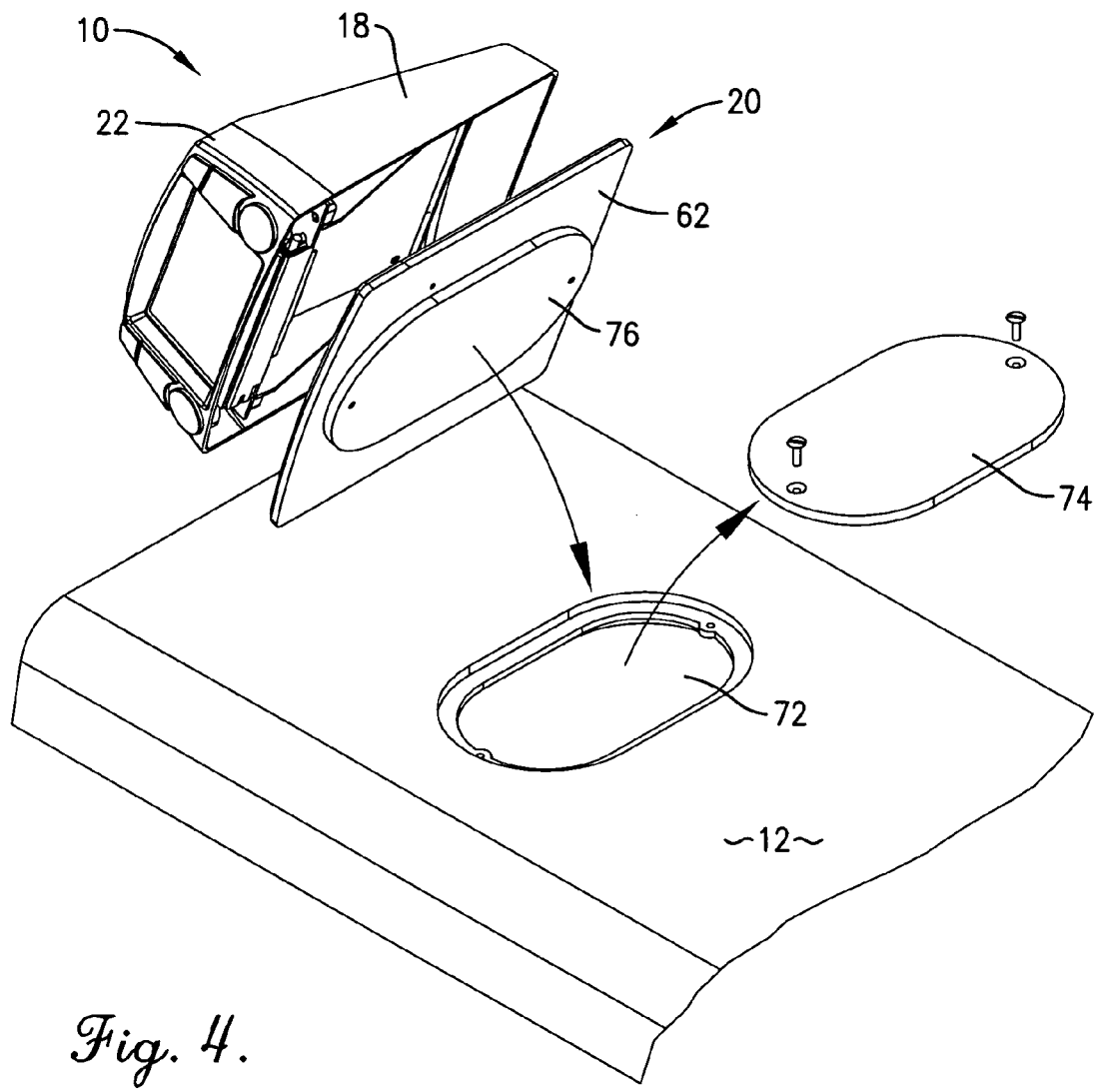
FIG. 4 is an exploded isometric view of the GPS system showing how it can be mounted over an existing speaker cut-out or other opening on a vehicle dashboard.

As illustrated in FIG. 4, the base 20 may be configured for mounting over an existing opening 72 in the vehicle's dashboard 12 such as a cutout provided for an optional speaker. If a speaker is not placed in the opening 72, a cover plate 74 which covers the opening may be removed and the base 20 may be placed over the opening. In the illustrated embodiment, the bottom face 62 of the base includes a pedestal 76 in the same shape and size of the opening 72. When the base 20 is placed over the opening 72, the pedestal 76 extends into the opening 72 so as to stabilize the base 20 on the dashboard 12.

The base 20 may also include one or more openings for permitting cabling to extend between the GPS device 16 and components in the vehicle. For example, the GPS device 16 may be coupled with the vehicle's power bus for receiving power therefrom and/or the vehicle's data bus for receiving data therefrom. The data may include information related to the speed of the vehicle and any turns made by the vehicle for providing dead reckoning inputs to the GPS device for use when GPS satellites signals cannot be received such as when the vehicle is in a tunnel or parking garage.

The faceplate 22 is circumferentially mounted over the front of the display 30 and attached to the hood 18 so as to frame the display. As with the hood 18 and the base 20, the faceplate 22 is preferably made of the same or similar material as the dashboard and is colored to match or complement the dashboard.

A number of inputs 78 are positioned on the faceplate 22 and electrically coupled with the input contacts 38 of the GPS device 16 for providing user input to the processor 28. The inputs 78 are much larger than the typical control buttons on GPS devices so as to make it easier to operate the GPS device 16 while the user is driving or performing other activities. In preferred forms, the inputs 78 include a number of control buttons which may be used to turn the GPS device on and off, control the display of cartographic map data on the display, and input navigation data into the processor. An infrared receiver 80 may also be positioned on the faceplate 22 for wirelessly receiving data and instructions transmitted from an infrared transmitter such as those found on remote control devices.

As detailed in the preceding description, the GPS system 10 of the present invention can be advantageously mounted on a dashboard of any vehicle after the vehicle has been manufactured yet appears to be integral with the dashboard. The GPS system 10 therefore provides the professional, "finished" appearance of factory-installed GPS devices while being relatively inexpensive and easy to install in any vehicle. The GPS system 10 may also be mounted on top of a vehicle's dashboard 12, rather than in the vehicle's center stack, where it can be more easily viewed without drawing a driver's attention from the road. Unlike portable GPS devices, the GPS system 10 of the present invention is more firmly mounted to the dashboard and placed in a fixed location so that a user always knows where it is. The fixed mounting also prevents the GPS device from becoming loose or dislodged from the dashboard because of vehicle's vibrations and other movements.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A navigation system for mounting on a vehicle dashboard, the navigation system comprising:
   a portable GPS device including—
      a GPS receiver for receiving GPS signals from a plurality of GPS satellites,
      a processor coupled with the GPS receiver for determining a location of the device as a function of the GPS signals,
      a display coupled with the processor for displaying information corresponding to the location of the GPS device, and
      a housing on which the display is mounted and in which the GPS receiver and the processor are housed;
   a hood for substantially covering the housing of the GPS device while permitting viewing of the display, wherein the hood is configured to appear integral with the dashboard; and a base for supporting the GPS device and the hood on the dashboard.

2. The navigation system as set forth in claim 1, the hood being formed of a material similar to the dashboard and being colored similar to the dashboard so as to appear integral with the dashboard.

3. The navigation system as set forth in claim 1, wherein the base includes a top face and a bottom face, wherein the bottom face is contoured to align with contours of the dashboard to substantially level the top face relative to horizontal.

4. The navigation system as set forth in claim 1, further including a faceplate circumferentially mounted over the display so as to frame the display.

5. The navigation system as set forth in claim 4, further including a plurality of inputs positioned on the faceplate for providing user input to the processor.

6. The navigation system as set forth in claim 5, wherein one of the inputs is an infrared receiver for receiving wirelessly transmitted instructions from an infrared transmitter.

7. The navigation system as set forth in claim 5, wherein at least one of the inputs is a control button for controlling functions of the GPS device.

8. The navigation system as set forth in claim 1, wherein the display is a touch screen display.

9. The navigation system as set forth in claim 1, wherein the housing of the GPS device is wedge-shaped and tapered from front to back so as to fit on the dashboard under the vehicle's windshield.

10. The navigation system as set forth in claim 1, the GPS device further including a GPS antenna mounted on the housing and coupled with the GPS receiver for facilitating receipt of the GPS signals.

11. The navigation system as set forth in claim 10, wherein the housing is partially metallic and is electronically coupled with the GPS antenna so as to serve as a ground plane for the GPS antenna.

12. The navigation system as set forth in claim 10, wherein the housing includes a planer, top wall on which the GPS antenna is mounted, wherein the top wall is angled relative to horizontal for titling the GPS antenna relative to horizontal for enhancing reception of the GPS signals.

13. The navigation system as set forth in claim 1, the GPS device further including a speaker mounted on the housing and coupled with the processor.

14. The navigation system as set forth in claim 1, the GPS device further including a memory card slot coupled with the processor for removably receiving memory cartridges on which navigation data is stored.

15. The navigation system as set forth in claim 1, wherein the GPS device is configured for coupling with the vehicle's power bus for receiving power therefrom.

16. The navigation system as set forth in claim 1, wherein the GPS device is configured for coupling with the vehicle's data bus for receiving data therefrom.

17. The navigation system as set forth in claim 16, wherein the data includes data related to a speed of the vehicle and data related to turns made by the vehicle for providing dead reckoning capabilities to the GPS device when the GPS satellite signals cannot be received.

18. A navigation system for mounting on a vehicle dashboard, the navigation system comprising:
 a portable GPS device including—
  a GPS receiver for receiving GPS signals from a plurality of GPS satellites,
  a processor coupled with the GPS receiver for determining a location of the device as a function of the GPS signals,
  a display coupled with the processor for displaying information corresponding to the location of the GPS device, and
  a housing on which the display is mounted and in which the GPS receiver and the processor are housed;
 a faceplate circumferentially mounted over the display and including a plurality of inputs for providing user input to the device;
 a hood for substantially covering the housing of the GPS device while permitting viewing of the display, wherein the hood is configured to appear integral with the dashboard; and
 a base for supporting the GPS device and the hood on the dashboard.

19. The navigation system as set forth in claim 18, wherein one of the inputs is an infrared receiver for receiving wirelessly transmitted instructions from an infrared transmitter.

20. The navigation system as set forth in claim 18, wherein at least one of the inputs is a control button for controlling functions of the GPS device.

21. The navigation system as set forth in claim 18, wherein the base includes a top face and a bottom face, wherein the bottom face is contoured to align with contours of the dashboard to substantially level the top face relative to horizontal.

22. The navigation system as set forth in claim 18, wherein the housing of the GPS device is wedge-shaped and tapered from front to back so as to fit on the dashboard under the vehicle's windshield.

23. A navigation system for mounting on a vehicle dashboard, the navigation system comprising:
 a portable GPS device including—
  a GPS receiver for receiving GPS signals from a plurality of GPS satellites,
  a processor coupled with the GPS receiver for determining a location of the device as a function of the GPS signals,
  a display coupled with the processor for displaying information corresponding to the location of the GPS device, and
  a housing on which the display is mounted and in which the GPS receiver and the processor are housed;
 a faceplate circumferentially mounted over the display and including a plurality of inputs for providing user input to the display;
 a hood for substantially covering the housing of the GPS device while permitting viewing of the display, wherein the hood is configured to appear integral with the dashboard; and
 a base for supporting the GPS device and the hood on the dashboard.

24. The navigation system as set forth in claim 23, the hood being formed of a material similar to the dashboard and being colored similar to the dashboard so as to appear integral with the dashboard.

25. The navigation system as set forth in claim 23, wherein the base includes a top face and a bottom face, wherein the bottom face is contoured to align with contours of the dashboard to substantially level the top face relative to horizontal.

26. The navigation system as set forth in claim 23, wherein the housing of the GPS device is wedge-shaped and tapered from front to back so as to fit on the dashboard under the vehicle's windshield.

* * * * *